US006203428B1

(12) United States Patent
Giobbi et al.

(10) Patent No.: US 6,203,428 B1
(45) Date of Patent: Mar. 20, 2001

(54) VIDEO GAMING DEVICE HAVING MULTIPLE STACKING FEATURES

(75) Inventors: John J. Giobbi, Crown Point, IN (US); Joel R. Jaffe, Evanston, IL (US)

(73) Assignee: WMS Gaming Inc., Chicago, IL (US)

( * ) Notice: Subject to any disclaimer, the term of this patent is extended or adjusted under 35 U.S.C. 154(b) by 0 days.

(21) Appl. No.: 09/392,980

(22) Filed: Sep. 9, 1999

(51) Int. Cl.[7] ...................................................... A63F 13/00

(52) U.S. Cl. ................................ 463/16; 463/18; 463/19; 463/13; 463/25

(58) Field of Search ................................. 463/16, 17, 18, 463/19, 20, 21, 27, 12, 13; 273/143 R, 293, 269

(56) References Cited

U.S. PATENT DOCUMENTS 4,798,387 * 1/1989 Richardson .......................... 273/237
5,356,140 10/1994 Dabrowski et al. .
5,401,024 * 3/1995 Simunek .......................... 273/138 A
5,531,441 * 7/1996 Dabrowski et al. ................... 463/12
5,573,249 11/1996 Johnson .
5,639,092 6/1997 Macaisa .
5,704,835 * 1/1998 Dietz, II ................................ 463/20
5,823,873 10/1998 Moody .
5,951,397 9/1999 Dickinson .
5,976,016 * 11/1999 Moody et al. ......................... 463/13

* cited by examiner

*Primary Examiner*—Valencia Martin-Wallace
*Assistant Examiner*—Julie Kasick
(74) *Attorney, Agent, or Firm*—Jenkens & Gilchrist

(57) ABSTRACT

An electronic video gaming machine for playing multiple games substantially at the same time is set forth. The gaming machine includes a plurality of game boards arranged in a stack and displayed on a touch screen. The stack includes a top end and a bottom end and each game board has a face on which a single game is displayed. A plurality of game control buttons and game control indicators are provided for operating the game and selecting game elements, such as lucky numbers, random numbers, and bingo patterns, to be applied to each game board in the stack. A number of game boards to be played in the stack is selectable by the player and a winning game board is indicated to the player such that the winning game board appears to pop-up from the stack in cash-register-like fashion such that the face of the winning game board is more visible relative to prior said game board popping up. The face of any game board is viewable by the player by touching the touch screen at a location of the game board to be viewed. After touching the game board, the game board slides out from the stack to expose its face.

49 Claims, 5 Drawing Sheets

VIDEO GAMING DEVICE HAVING MULTIPLE STACKING FEATURES

FIELD OF THE INVENTION

The present invention relates generally to gaming machines and, more particularly, to video gaming machines for playing multiple games simultaneously.

BACKGROUND OF THE INVENTION

Video gaming machines are well known in the art and many types of electronic video gaming machines have been developed. These machines are microprocessor-based and, in the event of a displayed winning combination of game elements, pay out either in the form of credits accumulated in the machine or in negotiable currency. One common type of video gaming machine is a video poker machine designed to replicate the play of a hand of poker. Typically, the player is not playing against any other players or against a dealer's hand, but the player is simply attempting to achieve the highest ranking poker hand possible from the cards displayed to the player. The higher the poker hand achieved by the player, the greater the player's winnings. Some of the card games adapted to electronic video gaming machines display both the player's hand and a dealer's hand. This occurs in those games, including poker, where the player must beat the dealer in order to win.

In some of the electronic video gaming machines, the player receives only a single hand from the electronic deck of cards. If the player receives an initial deal of poor cards, the player feels that his chances of winning are greatly reduced because the possibility of improving his hand by discarding and receiving replacement cards is not good. To increase the opportunity to win, players prefer to play multiple hands at the same time. Playing multiple hands increases the chance of at least one of the hands turning-up a wining combination. As a result, a player will perceive a better chance of winning and continue playing the machine.

The electronic video medium lends itself more readily to providing simultaneous multiple game play for some games more than others. While simultaneous multiple game play may be adopted to all types of poker games and other card games such as Twenty-One or Blackjack, it can be adapted for other games as well. For example, an electronic video gaming machine is particularly suited for the game of Bingo, especially since, in conventional non-electronic Bingo, players prefer to play with several game boards at the same time to increase their chances of winning. Such use by players of more than one game board is also advantageous to the game operator in that a charge is collected for each board used. These advantages are also carried over in video gaming versions.

In addition to the simultaneous play of multiple games, several other advantages that are capable of attracting players are appreciated in video versions. For example, in conventional Bingo, the use of many boards by a single player takes up space which might be used to accommodate another player. Further, the use of many such boards by a single player can slow the overall program to the discontent of other players. In addition, many players would like to play with more boards but are limited by their own dexterity and inability to see and follow more than one or two boards. Also, it is desirable for the player to have the ability to have the shape of a winning array promptly displayed on the board and to be provided with an automatic indication of when that array has been achieved. Not only are all of these problems solved by using electronic video gaming machines, but also, video gaming machines are capable of providing the player with additional features that increase the entertainment value of the machine and attract frequent play.

Electronic video gaming machines provide definite advantages for the player and casino operator over traditional versions. This is especially true for electronic video machines having the capability of playing multiple games at the same time. Because of these advantages in player appeal and excitement relative to traditional non-video versions, there is a continuing need for gaming machine manufacturers to produce new types of games and attractive enhancements.

SUMMARY OF THE INVENTION

The present invention is an electronic video gaming machine for playing multiple games substantially simultaneously. The gaming machine includes a housing, a video screen mounted to the housing, and a plurality of game control buttons disposed on at least one of the housing and the video screen. A processor is included for controlling game play and is responsive to the game control buttons for operating the gaming machine. The video gaming machine includes a play mode display shown on the video screen. The play mode display includes a plurality of overlapping game boards arranged in a stack from a top end to a bottom end such that a face of the game board at the top end is substantially visible and a face of the game board at the bottom end is substantially hidden. The game boards bear respective games to be played substantially simultaneously to determine respective game outcomes.

Another aspect of the invention provides a method for playing multiple games substantially simultaneously on an electronic video gaming machine. The method includes the step of providing a play mode display on a video screen. The play mode display includes a plurality of overlapping game boards arranged in a stack from a top end to a bottom end such that a face of the game board at the top end is substantially visible and a face of the game board at the bottom end is substantially hidden. A wager is placed on the game boards to be played in the stack. Games are provided on each of the respective games boards to be played in the stack. The games are played substantially simultaneously to determine respective game outcomes for the respective game boards, and the wager is resolved.

BRIEF DESCRIPTION OF THE DRAWINGS

The foregoing and other advantages of the invention will become apparent upon reading the following detailed description and upon reference to the drawings in which.

Figure 1:
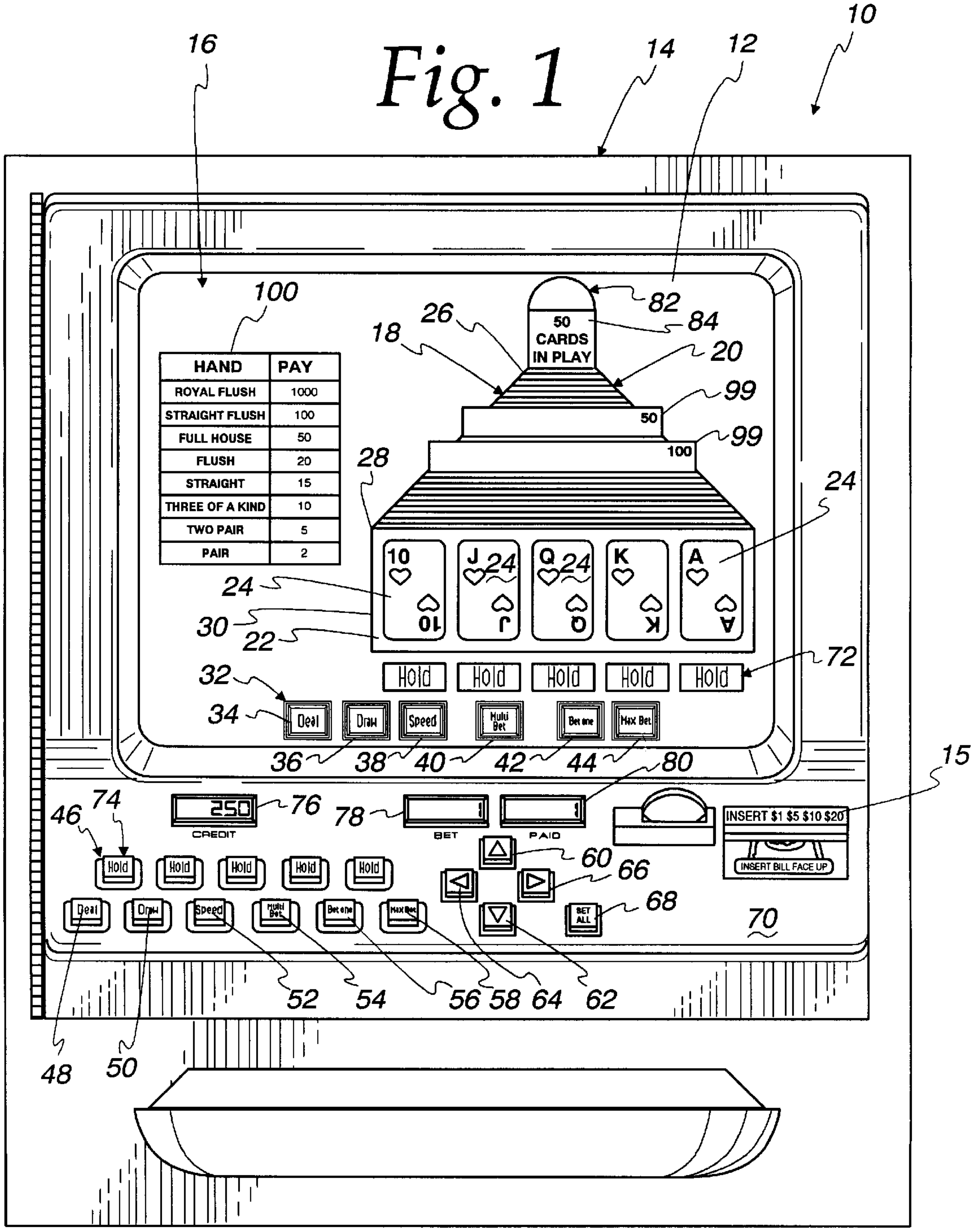
FIG. 1 is an illustration of a video gaming machine showing a "play mode" display for a poker game.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is illustrated a video gaming machine 10 having a video screen 12 secured within a housing 14. Within the housing 14 is located a processor-based circuit (not shown) which includes appropriate components and circuitry to operate the video gaming machine 10. Game play is generally initiated by inserting a number of coins via a monetary input device 15 or playing a number of credits.

In one embodiment of the invention as shown in FIG. 1, a poker game in "play mode" is displayed on the video screen 12. Included on a "play-mode" display 16 is a depiction of a stack 18 of game boards 20 for playing multiple game boards 20 substantially simultaneously. The game boards 20 can be played individually or may be interlinked in some manner such that at least one game board 20 has an effect on other game boards 20. For example, to interlink the game boards 20 in a draw version of poker, cards selected to be held in one hand of a game board 20 are also held in the remaining hands of other game boards 20.

Each game board 20 includes a face 22 that displays cards 24 of a single hand of a five-card poker game, for example. The stack 18 is shown on the video screen 12 in a generally three-dimensional top-perspective view such that game boards 20 located at a bottom end 26 of the stack 18 are smaller relative to boards located towards a top end 28 of the stack 18 and such that the entire face 22 of a topmost game board 30 is visible while other game boards 20 in the stack 18 are substantially hidden.

To control the basic operation of the game, the video screen 12 may be a touch screen for additionally displaying appropriate game control buttons or indicators 32, such as a "deal" indicator 34, a "draw" indicator 36, a "speed" indicator 38, a "multi-bet" indicator 40, a "bet one" indicator 42, and a "max bet" indicator 44. However, sometimes players may prefer to use game control buttons 46 mounted on the housing 14 instead of the touch screen indicators 32. To that end, the machine includes appropriate game control buttons 46 such as a "deal" button 48, a "draw" button 50, a "speed" button 52, a "multi-bet" button 54, a "bet one" button 56, a "max bet" button 58, an "up-arrow" button 60, a "down-arrow" button 62, a "left arrow" button 64, a "right arrow" button 66 and a "set all" button 68 on a deck portion 70 of the machine housing 14. If the game is a draw version of poker, the machine accepts game control inputs either from the touch screen 12 with the "hold" indicators 72 or "hold" buttons 74 on the deck 70. The experienced player can play the poker game faster by using the buttons 46 which will tend to increase the player's enjoyment of the game while at the same time increase the potential earnings of the machine 10. On the other hand, the less experienced players can use the touch screen 12 to control the game which can increase the player's enjoyment of the game and may encourage further play. The display 16 and/or deck portion 70 further include a credit window 76 showing the number of credits available for play, a bet window 78 showing the number of credits bet on the current game, and a paid window 80 showing the number of credits won in the last game.

The "play-mode" display 16 further includes a stack tab 82 for selecting the number of game boards 20 to be played. The stack tab 82 is movable up and down the stack 18 either via the touch screen 12 or by the "up-arrow" button 60 or "down-arrow" button 62 located on the deck 70 of the machine 10. For example, by pressing the "up-arrow" button 60, the player increases the number of game boards 20 to be played; and by pressing the "down-arrow" button 62 the player decreases the number of game boards 20 to be played. If the player uses the touch screen 12 to move the stack tab 82, the player touches a finger to the touch screen 12 at the stack tab 82 and drags the finger along the touch screen 12 to select a desired number of game boards 20. To maintain a three-dimensional look, the stack tab 82 varies in size as it is moved along the stack 18. In particular, the stack tab 82 appears larger the closer it is to the top end 28 relative to the bottom end 26 of the stack 18. The stack tab 82 includes a counter 84 which displays a total number of game boards 20 in the stack 18. As the stack tab 82 is moved along the length of the stack 18, the total number of game boards 20 displayed by the counter 84 changes accordingly to reflect the number of game boards 20 in the stack 18.

The "bet one" indicator 42 or button 56 is used by the player to select the number of coins or credits to be wagered, or a bet amount. With each press of the "bet one" button 56 or touch of the "bet one" indicator 42, the bet amount is incremented by a predetermined amount and displayed on the bet window 78 on the deck 70. Thereby, the bet amount is advanced through a predetermined range and after reaching a maximum bet amount, selecting the "bet one" indicator 42 or button 56 loops the bet amount back to a minimum bet amount. Also, the player may use a "max bet" indicator 44 or button 58 to place the maximum allowable bet.

Figure 2:
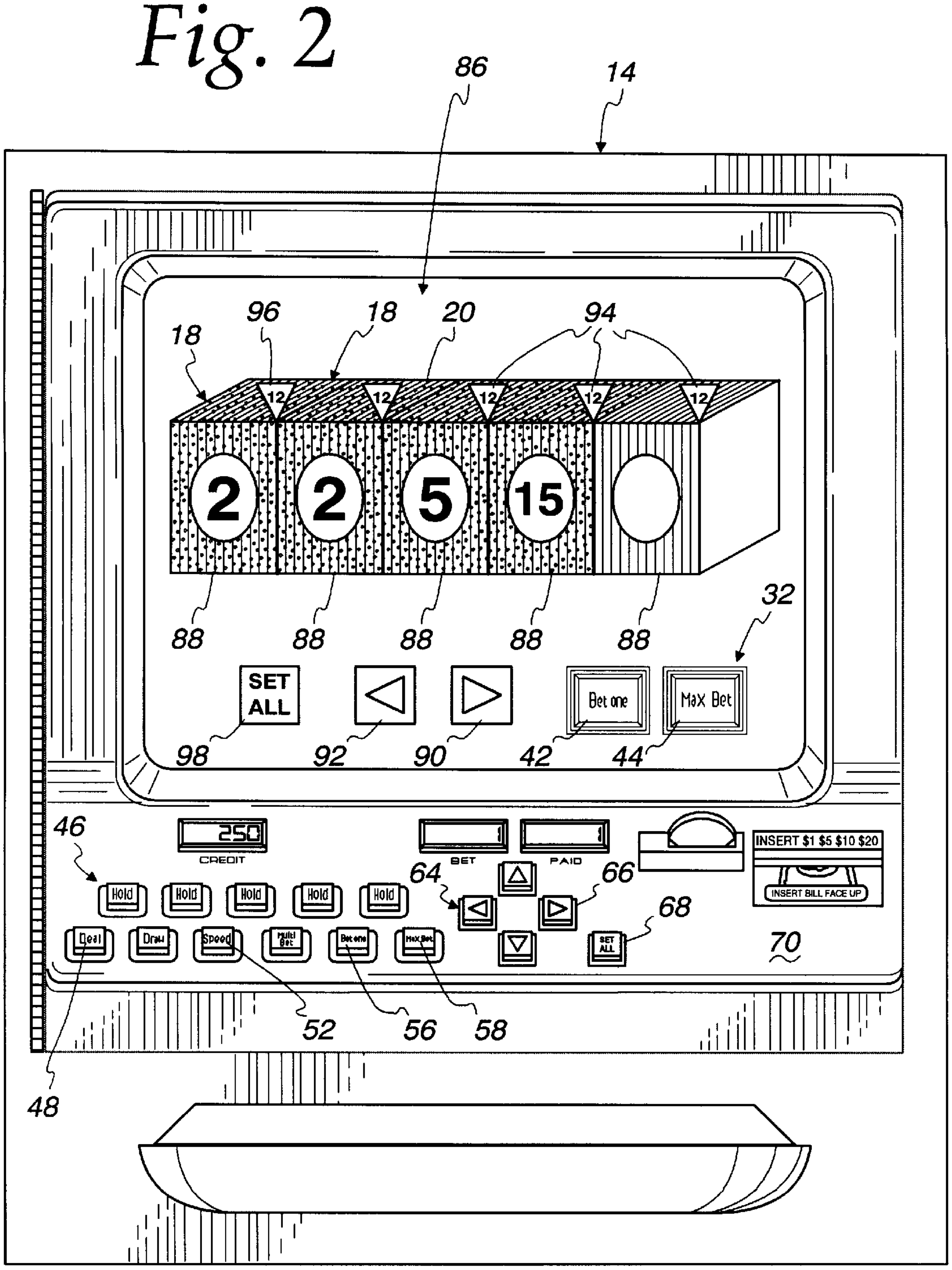
FIG. 2 shows an enlarged view of a "bet mode" display on the screen of the video gaming machine adapted for playing poker.

As an alternative to placing a single bet amount on the whole stack 18, it is also possible to place different bet amounts on individual sections of the stack. In such an embodiment, a "bet mode" of the game is activated by the player by touching the "multibet" indicator 40 on the touch screen 12 or the "multi-bet" button 54 on the deck 70. The "bet mode" is adapted for placing bets on sections of game boards 20 in the stack 18 and is accompanied by a "bet-mode" display 86 as shown in FIG. 2.

The "bet-mode" display 86 includes a side-view of the stack 18 containing a number of game boards 20 selected by the player with the stack tab 82. Also, the stack 18 is divided into more than one section 88. Each section 88 includes a predetermined number of game boards 20. To advance from one deck section 88 to another in order to place different bets on each section, a "right-arrow" indicator 90 and a "left-arrow" indicator 92 and corresponding buttons 66, 64 are included on the display 86 and deck 70. A visual indication, such as illumination of a stack section 88, is provided to inform the player which stack section 88 is selected for betting. The player then uses the "max bet" or "bet one" indicators 44, 42 or buttons 58, 56 to set the desired bet amount on each stack section 88.

In one embodiment, the player selects the number of game boards 20 in each stack section 88 by using indicators 32 or buttons 46 on the deck 70 to increase or decrease the number of game boards 20. Also, the bet-mode display 86 can be provided with a plurality of section tabs 94 located between stack sections 88 as shown in FIG. 2. Touching and dragging a section tab 94 can change the number of game boards in each stack section 88. A number of game boards 20 selected for each stack section 88 appears in a section counter 96 provided in each section tab 94.

To apply a single wager amount to all of the boards in the stack 18 while the game is in "bet mode," a "set all"

indicator 98 is included in the "bet-mode" display 86 and a corresponding "set all" button 68 is provided on the deck 70. While in the "bet mode," selecting "set all" places a single wager amount selectable by the player on all of the game boards 20 in the stack 18. The "set all" indicator 98 or button 68 may be selected before or after selecting the bet amount.

The transition from "play mode" to "bet mode" and vice versa can be achieved in many ways. For example, the "bet mode" display 86 may be displayed concurrently with the "play mode" display 16, replace the "play mode" display 16 entirely, overlay the "play mode" display 16, or be animated from the "play mode" display 16 such that the stack 18 shown in the "play mode" display 16 rotates to provide the side-view of the stack 18. The game may commence in either mode.

Referring back to FIG. 1, another feature is the pop-up of individual game boards 20 having winning game outcomes. After the player selects the "deal" indicator 34 or button 48, cards 24 are dealt into each hand of each game board 20 and the microprocessor determines a card game outcome for each game board 20 and determines which game boards 20 carry winning game outcomes or rankings. A winning game board 99 is a game board 20 that holds a winning game outcome. Winning game boards 99 are indicated to the player by having the winning game boards 99 pop-up from the stack 18 in a cash-register-like fashion such that the face 22 of a winning game board 99 is more visible than if the same game board 20 did not have a winning game outcome.

The pop-up of winning game boards 99 can occur simultaneously or can proceed successively from the bottom end 26 towards the top end 28 of the stack 18 or from the top end 28 towards the bottom end 26 of the stack 18. Also, the pop-up of each winning game board 99 can be accompanied by sound such as a ring of a bell or a "chi-ching" of a cash register to enhance player excitement. In the event a plurality of winning game boards 99 occur, multiple sounds will signal the multiple wins. To achieve different effects, the speed with which winning game boards 99 are indicated to the player by color and/or popup can be varied by the player using the "speed" button 52 or indicator 38 or pre-set by the casino operator. On the one hand, for example, a slow rate of color change and/or pop-up may instill the player with anticipation for the next winning game board 99. On the other hand, an accelerated rate will provide yet a different visual and acoustical effect for player excitement.

A paytable 100 of the type generally depicted in FIG. I for a poker game is provided either on the game machine housing 14 or on the "play mode" display 16 and displays winning game outcomes. The paytable 100 identifies the amount of coins or credits awarded for various outcomes of symbols or number of "hits" that may appear in a game. For example, in a poker game, if the player is not playing against a dealer's hand, which would be displayed if such were the case, the player's winnings will be greater, the higher the poker hand achieved by the player. This is reflected in the paytable 100 shown in FIG. 1. For example, a royal flush pays more than two-of-a-kind. Also, in one embodiment, the winning card game outcomes are color-coded such that each winning game outcome has an associated color as shown on the paytable 100. A game board 20 resulting in a winning game outcome changes to the color corresponding to the winning card ranking as coded on the paytable 100. For example, a royal flush can be indicated in gold letters on the paytable and when a royal flush is achieved in a game board 20, that winning game board 99 will change to a gold color.

After the winning game boards 99 are indicated to the player, the entire face 22 of any winning or losing game board in the stack 18 can be viewed by touching the touch screen 12 at the location of the game board 20. When the game board 20 to be viewed is touched, that game board 20 appears at the top 28 of the stack 18 such that the entire face 22 of the game board 20 is shown. Alternatively, the touched game board 20 may retain its original location in the stack but pop-up such that the entire face 22 of the game board 20 is visible.

Figure 3:
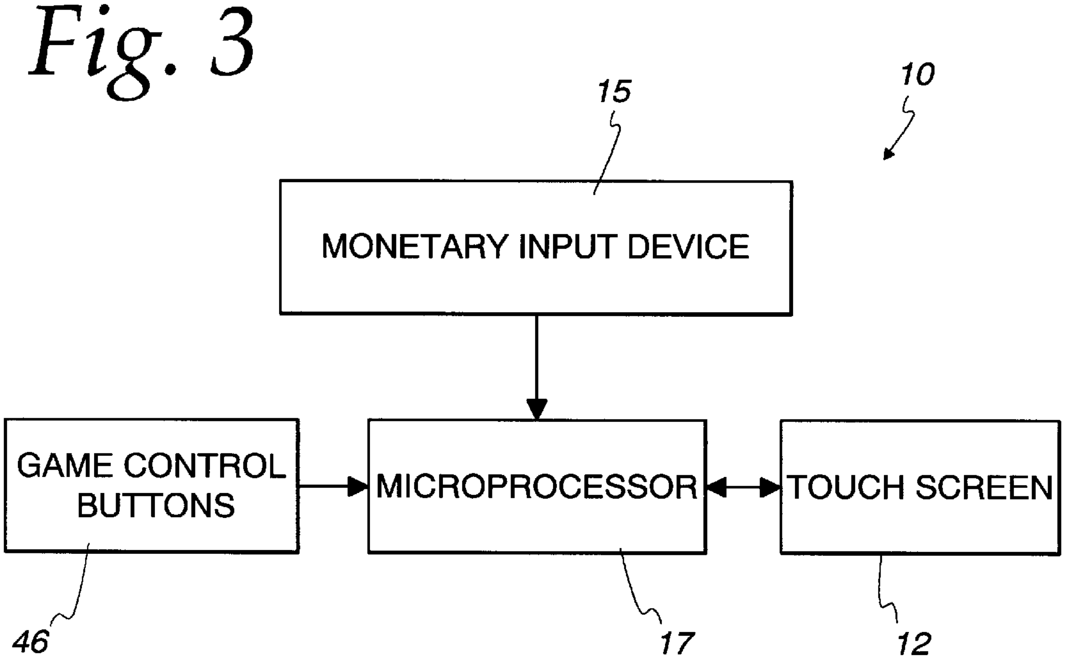
FIG. 3 is a block diagram of the video gaming machine architecture.

FIG. 3 is a block diagram of the gaming machine 10 including a touch screen 12, a monetary input device 15, a microprocessor 17, and game control buttons 46. The particular game architecture shown is a generic architecture using components typical to game apparatuses suitable for use with the present invention. The microprocessor 17 implements the functions of the gaming machine 10 and includes several input and output functions. The microprocessor 17 includes a digital microprocessor or similar controller device and other electronic components such as display drivers and graphics chips necessary for implementing and controlling the gaming machine 10. Various input devices such as the touch screen 12, the monetary input device 15, and game control buttons 46 are used by a player to provide input to the gaming machine to influence game events and to achieve predetermined goals. The touch screen 12 provides input functions via machine control buttons or indicators 32, for example, as well as output functions such as providing visual feedback such as images to the player during the game. Other visual output devices include the credit window 76, bet window 78, paid window 80, and various light sources. Auditory output such as sound effects or speech may be provided by other game output devices such as speakers and alarms.

Figure 4:
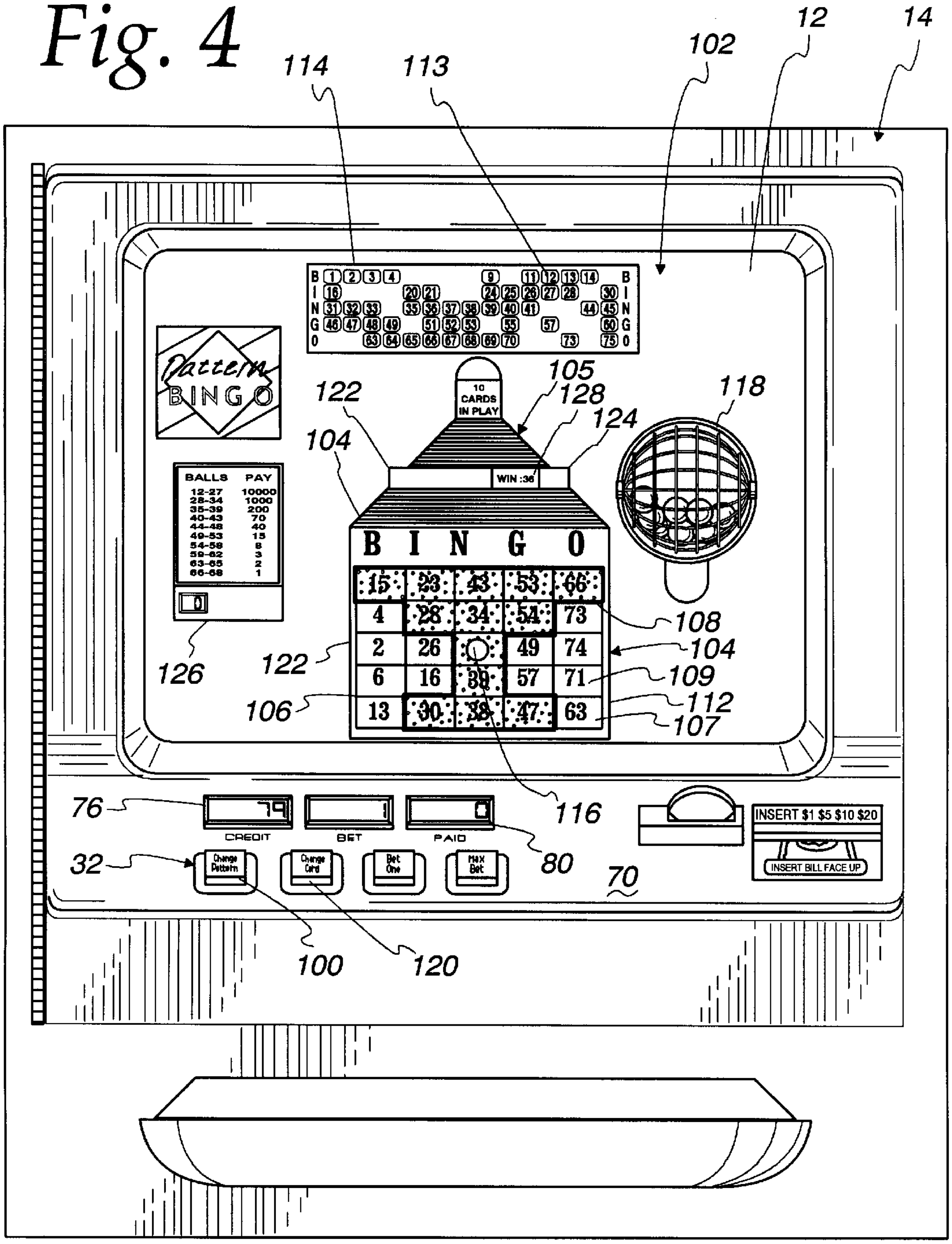
FIG. 4 shows a video gaming machine adapted for playing bingo.

While the invention is described with respect to a simulated poker game, the invention can be applied to other games as well. For example, a video version of bingo according to the invention is shown in FIG. 4. A bingo game display 102 includes a depiction of multiple bingo game boards 104 arranged in a stack 105 as described above and like numerals are used to identify like features. In the bingo version, the face 106 of each game board 104 resembles a traditional bingo board and includes a five-by-five array 107 of preselected numbers 109; however, the shape or size of the array 107 which the present invention may take is not intended to be limited to such. All of the preselected numbers 109 in each array 107 are randomly selected for each individual bingo game board 104 or, alternatively, a portion of the preselected numbers 109 in the array 107 are the same for all of the bingo game boards 104. Duplicating a portion of the preselected numbers 109 into all of the bingo game boards 104 in the stack 105 is one way of interlinking the game boards 104.

As in traditional bingo, in one embodiment, the object of the game is to have randomly called numbers coincide with preselected numbers on any of player's game boards so as to fill the entire board or to form a specified shape or pattern 108. The specified shape or pattern 108 may be an "X" "T", "L", a diagonal line, a horizontal line, a vertical line and so on. The pattern 108 is selected by touching a "change pattern" indicator on the touch screen (not shown) or a "change pattern" button 110 on the deck 70. Once selected, the pattern 108 is duplicated onto all of the bingo game boards 104 in the stack 105 and is shown on a topmost game board 112 whose board face 122 is entirely visible. Alternatively, a different pattern 108 is selected for each bingo game board 104 either by the player or randomly by the machine 10 such that more than one pattern 108 is found in the stack 105. Further yet, in another embodiment, any specified winning pattern 108 can be achieved on any bingo game board 104. For example, for bingo game boards 104 having a five-by-five array 107, a winning pattern 108 may include any row of five numbers. In such a version, multiple winning patterns on a single bingo game board 104 are possible. In one embodiment, a preselected number of random numbers is drawn and then the number of winning patterns in the stack 105 determined. The preselected number of random numbers can include all of the possible random numbers. When the number of winning patterns in the stack 105 is determined, the payout amount is resolved in accordance with a paytable, for example, as described below.

In one embodiment, a "bet mode" display as described above and shown in FIG. 2 is adapted to the bingo version for placing different bet amounts on individual stack sections. As described above, the "bet mode" display includes a side-view of the stack containing a number of bingo game boards 104.

Random numbers are drawn from a field 113 of numbers that are displayed in a number table 114. Those random numbers that coincide with the pre-selected numbers 109 on a game board 104 are automatically marked in some fashion such as with a red dot 116. The number table 114 displays the numbers that have not been called. The video screen 12 also displays an animated tumbler 118 for increased player enjoyment. The random numbers are applied to all of the bingo game boards 104 in the stack 105 or, alternatively, different random numbers are chosen by the microprocessor for each bingo game board 104 and a corresponding number table 114 is provided for each.

The player may choose to view any game board 104 in the stack 105 by touching the video touch screen 12 of the game board 104 or by pressing a "change card" button 120 on the deck 70 and the player can see how many squares have yet to be filled to complete a pattern 108 and thereby achieve a winning game outcome. A winning game board 124 is indicated to the player by changing the color of the card and/or with the popup feature such that a winning game board 124 pops-up from the stack 105 such that the face 122 of the winning game board 124 is more visible than if the same game board 124 was a non-winning game board 104. Also, the pop-up of each winning game board 124 can be accompanied by sound such as a voice yelling "bingo" to enhance player excitement.

After the winning game board 124 is indicated to the player, the entire face 122 of any winning or losing game board 104 in the stack 105 can be viewed by touching the touch screen 12 at a location of the game board 104 to be viewed. A paytable 126 displayed on the touch screen 12 or housing 14 shows the amount won on any winning game board 124. Generally, the paytable 126 is graduated such that the payout amount is greater if a pattern is completed with fewer drawings of random numbers than if most of the random numbers have been called at the time of winning. In one embodiment, a window 128 is provided on a winning game board 124 to indicate the number of random numbers drawn for that winning game board 104, or for example, the name of the winning card hand in the poker version. The appropriate payout amount is included in the "paid" window 80 and added to the "credit" window 76 and, in one embodiment, the payout amount is indicated on the window 128.

Figure 5:
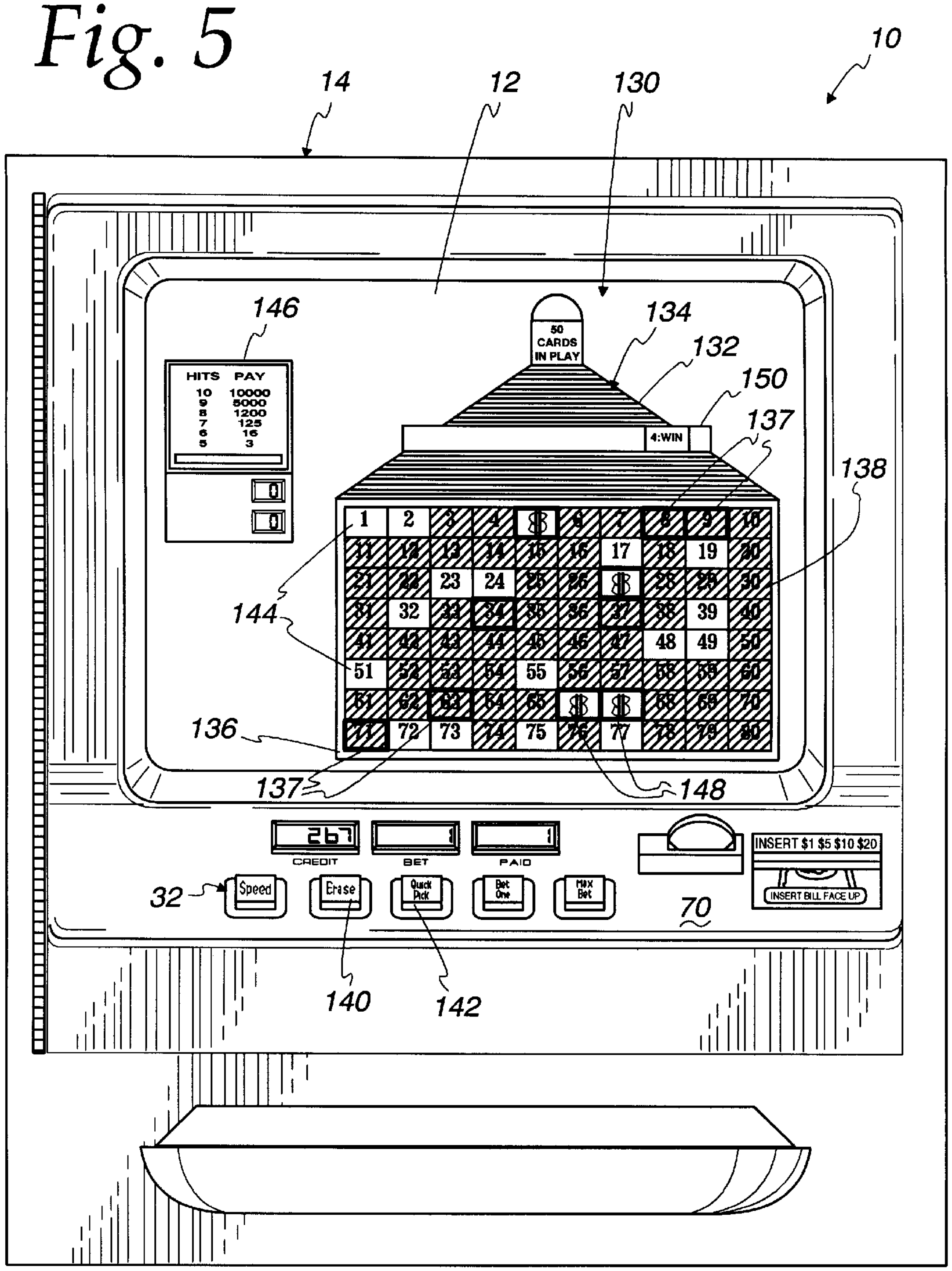
FIG. 5 shows a video gaming machine adapted for playing keno.

Another adaptation of the present invention is a video version of keno shown in FIG. 5 which is adapted for playing multiple keno games substantially at the same time. A display 130 includes a depiction of multiple keno game boards 132 arranged in a stack 134 in the same fashion described above. In the keno version of this invention, each game board 132 includes a face 136 with a field 138 of numbers generally in a ten-by-eight array of squares with numbers ranging from one to eighty displayed in each square; however, the shape and size of the field 138 which the present invention may take is not intended to be limited to such.

As in traditional keno, the player picks ten or less lucky numbers 137 by touching the screen 12 at the location of each desired number on the field 138. Touching a lucky number 137 again or pressing an "erase" button 140 will erase a selection. Alternatively, the player may have the gaming machine 10 randomly select the ten numbers by pressing a "quick pick" button 142 on the deck 70. For example, to interlink the keno game boards 132 in the stack 134, the lucky numbers 137 are applied to the entire stack and are therefore the same in all of the keno game boards 132 in the stack 134. The lucky numbers 137 are marked in some fashion such as with illumination, a change in color, or a highlighted square border. As shown in FIG. 5, for example, the lucky numbers 137 are 5, 6, 9, 27, 34, 37, 63, 66, 67, and 71. The gaming machine's microprocessor 17 then randomly chooses twenty winning numbers 144 from the field 138 of numbers, generally one through eighty, for each game board 132 and displays those winning numbers 144 on the face 136 of each keno game board 132 in some fashion such as with illumination. In FIG. 5, the winning numbers 144 are shown to be 1, 2, 5, 17, 19, 23, 24, 27, 32, 39, 48, 49, 51, 55, 66, 67, 72, 73, 75, and 77. A different set of winning numbers 144 is generated for each keno game board 132 in the stack 134 or alternatively the same random numbers are applied to the whole stack 134. In another embodiment, a portion of the randomly chosen winning numbers 144 are applied to all keno game boards 132 in the stack 134 and the remainder of the winning numbers 144 are randomly chosen for each individual game board 132. For example, out of twenty winning numbers 144, ten winning numbers 144 are applied to all of the keno game boards 132 and, therefore, are identical for each keno game board 132. The remaining ten winning numbers 144 are randomly chosen for each individual keno game board 132. The player wins based on the number of matching numbers 148. Matching numbers 148 are winning numbers 144 that correspond to the lucky numbers 137. The matching numbers 148, as shown in FIG. 5, for example, are 5, 27, 66, and 67. A paytable 146 reflects the payout amount accordingly. Matching numbers 148 or hits are indicated to the player in some fashion such as with a dollar sign.

During play or after winning, the player may choose to view any keno game board 132 in the stack 134 by touching the touch screen 12 at the location of the game 132. A winning keno game board 150 is indicated to the player with the pop-up feature described above and may be accompanied by sound as well. Furthermore, in another embodiment, a "bet mode" display as shown in FIG. 2 and described above is adapted to the keno version for placing different bet amounts on individual stack sections. As described above, the "bet mode" display includes a side-view of the stack containing a number of keno game boards 132.

While the present invention has been described with reference to one or more particular embodiments, those skilled in the art will recognize that many changes may be made thereto without departing from the spirit and scope of the present invention. While the invention is shown with respect to video versions of poker, bingo and keno, the present invention can be applied to other games as well, such as different versions of poker, blackjack, and twenty-one. Each of these embodiments and obvious variations thereof is contemplated as falling within the spirit and scope of the claimed invention, which is set forth in the following claims.

What is claimed is:

1. An electronic video gaming machine, comprising:

a housing;

a video screen mounted to said housing;

a plurality of game control buttons disposed on at least one of said housing and said video screen;

a processor for controlling game play and responsive to said game control buttons for operating said gaming machine; and a play mode display on said video screen, said play mode display including a plurality of overlapping game boards arranged in a stack from a top end to a bottom end such that a face of said game board at said top end is substantially visible and a face of said game board at said bottom end is substantially hidden such that numerical values on said game board at said bottom end are hidden, said game boards beating respective games to be played substantially simultaneously to determine respective game outcomes.

2. The electronic video gaming machine of claim 1 wherein said video screen includes a touch screen, and said game control buttons are displayed on said touch screen.

3. The electronic video gaming machine of claim 1 further including a movable stack tab displayed on said video screen for selecting and displaying a number of said game boards in said stack.

4. The electronic video gaming machine of claim 3 wherein moving said stack tab changes said number of said game boards in said stack.

5. The electronic video gaming machine of claim 1 wherein said games on said respective game boards are the same.

6. The electronic video gaming machine of claim 1 wherein said games are selected from the group consisting of poker, blackjack, twenty-one, bingo, and keno.

7. An electronic video gaming machine, comprising:

a housing;

a video screen mounted to said housing;

a plurality of game control buttons disposed on at least one of said housing and said video screen;

a processor for controlling game play and responsive to said game control buttons for operating said gaming machine; and a play mode display on said video screen, said play mode display including a plurality of overlapping same boards arranged in a stack from a top end to a bottom end such that a face of said game board at said top end is substantially visible and a face of said game board at said bottom end is substantially hidden, said game boards bearing respective games to be played substantially simultaneously to determine respective game outcomes;

wherein said stack of said game boards is displayed on said video screen in a substantially three-dimensional top perspective view such that said game boards adjacent to said top end appear larger relative to said game boards adjacent to said bottom end.

8. An electronic video gaming machine, comprising:

a housing;

a video screen mounted to said housing;

a plurality of game control buttons disposed on at least one of said housing and said video screen;

a processor for controlling game play and responsive to said game control buttons for operating said gaming machine; and a play mode display on said video screen, said play mode display including a plurality of overlapping game boards arranged in a stack from a top end to a bottom end such that a face of said game board at said top end is substantially visible and a face of said game board at said bottom end is substantially hidden, said game boards bearing respective games to be played substantially simultaneously to determine respective game outcomes;

wherein each game board with a winning game outcome is displayed on said video screen such that said winning game board appears to pop up from said stack so that said face of said winning game board is more visible than before said winning game board popped up from said stack.

9. The electronic video gaming machine of claim 8 wherein said winning game outcome is announced with sound.

10. The electronic video gaming machine of claim 8 wherein said winning game outcome is announced with a change in color of said winning game board.

11. The electronic video gaming machine of claim 8 wherein said winning game outcome is announced with a color corresponding to said winning game outcome as shown on a paytable.

12. The electronic video gaming machine of claim 8 wherein said processor varies the rate at which said winning game boards pop up from said stack.

13. An electronic video gaming machine, comprising:

a housing;

a video screen mounted to said housing;

a plurality of game control buttons disposed on at least one of said housing and said video screen;

a processor for controlling game play and responsive to said game control buttons for operating said gaming machine; and a play mode display on said video screen, said play mode display including a plurality of overlapping game boards arranged in a stack from a top end to a bottom end such that a face of said game board at said top end is substantially visible and a face of said game board at said bottom end is substantially hidden, said game boards bearing respective games to be played substantially simultaneously to determine respective game outcomes;

further including a bet mode display on said video screen, said bet mode display including a side view of said stack divided into stack sections.

14. The electronic video gaming machine of claim 13 wherein said bet mode display further includes a movable section tab between said stack sections.

15. The electronic video gaming machine of claim 13 wherein each stack section includes a respective number of said game boards selected by a player.

16. The electronic video gaming machine of claim 13 wherein each stack section is accompanied by a respective wager placed by a player.

17. A method for simultaneously playing multiple games on an electronic video gaming machine, comprising:

providing a slay mode display on a video screen, said play mode display including a plurality of overlapping game boards arranged in a stack from a top end to a bottom end such that a face of said game board at said top end is substantially visible and a face of said game board at said bottom end is substantially hidden;

placing a wager on said game boards to be played in said stack;

providing games on each of said respective games boards to be played in said stack;

playing said games substantially simultaneously to determine respective game outcomes for said respective game boards;

resolving said wager; and identifying each game board with a winning game outcome including causing said game board with said winning game outcome to pop-up from said stack in cash-register like fashion such that said face of said game board with said winning game outcome is more visible relative to prior said game board popping up.

18. A method for simultaneously playing multiple games on an electronic video gaming machine, comprising:

providing a play mode display on a video screen, said play mode display including a plurality of overlapping game boards arranged in a stack from a top end to a bottom end such that a face of said game board at said top end is substantially visible and a face of said game board at said bottom end is substantially hidden;

placing a wager on said game boards to be played in said stack;

providing games on each of said respective games boards to be played in said stack;

playing said games substantially simultaneously to determine respective game outcomes for said respective game boards;

resolving said wager; and displaying said stack of said game boards in a substantially three-dimensional top perspective view such that said game boards adjacent said top end appear larger relative to said game boards adjacent to said bottom end.

19. A method for simultaneously playing multiple games on an electronic video gaming machine, comprising:

providing a play mode display on a video screen, said play mode display including a plurality of overlapping game boards arranged in a stack from a top end to a bottom end such that a face of said game board at said top end is substantially visible and a face of said game board at said bottom end is substantially hidden such that numerical values on said game board at said bottom end are hidden;

placing a wager on said game boards to be played in said stack;

providing games on each of said respective games boards to be played in said stack;

playing said games substantially simultaneously to determine respective game outcomes for said respective game boards; and resolving said wager.

20. The method of claim 19 further including the step of identifying each game board with a winning game outcome.

21. The method of claim 20 wherein said step of identifying each game board with a winning game outcome includes successively identifying each winning game board from said bottom end of said stack towards said top end or vice versa.

22. The method of claim 21 wherein said step of identifying each game board with a winning game outcome includes varying the rate at which said winning game boards are identified.

23. The method of claim 19 wherein said video screen includes a touch screen, and further including the step of exposing said face of said game board to be viewed in response to touching said touch screen at a location of said game board to be viewed.

24. The method of claim 23 wherein said step of exposing said face of said game board further includes sliding said game board out from said stack to expose said face of said game board to be viewed.

25. The method of claim 19 further including the step of announcing a winning game outcome with sound.

26. The method of claim 19 further including the step of announcing a winning game outcome with a color associated with said winning game outcome as shown on a paytable.

27. The method of claim 19 further including the step of changing a color of said game board with a winning game outcome to correspond with a color associated with said winning game outcome as shown on a paytable.

28. The method of claim 19 further including the step of displaying a name of said winning game outcome on said face.

29. The method of claim 19 further including the step of selecting a number of said game boards to be played in said stack.

30. The method of claim 29 wherein said step of selecting a number of said game boards to be played in said stack further includes providing a movable stack tab.

31. The method of claim 30 wherein said video screen includes a touch screen, and further including the step of touching said touch screen at a location of said stack tab and dragging said stack tab to select said number of game boards to be played.

32. The method of claim 19 wherein said step of placing a wager on said game boards in said stack includes placing the same wager on all of said game boards.

33. The method of claim 19 further including the steps of:

providing said gaming a housing, said video screen being mounted to said housing;

providing a plurality of game control buttons on at least one of said housing and said video screen; and providing a processor for controlling game play and responsive to said game control buttons for operating said gaming machine.

34. The method of claim 19 wherein said step of providing games on each of said respective game boards to be played in said stack further includes providing the same games on all of said game boards to be played in said stack.

35. The method of claim 19 wherein said games are card games selected from the group consisting of poker, blackjack, and twenty-one, and further including the step of dealing cards into each game board from respective electronic decks.

36. The method of claim 19 wherein said games are bingo games and further including the steps of:

providing an array of preselected numbers on each game board; and providing at least one bingo pattern for all of said game boards.

37. The method of claim 36 further including the step of duplicating said bingo pattern into all of said game boards.

38. The method of claim 36 wherein said step of providing an array of preselected numbers further includes duplicating a portion of said preselected numbers into all of said game boards such that said portion is the same for all of said game boards in said stack.

39. The method of claim 36 further including the steps of:

drawing random numbers from a field of random numbers;

matching said drawn random numbers with said preselected numbers;

indicating said drawn random numbers that match said preselected numbers on said game boards with a marker; and completing said pattern on said game board with said markers, a winning game outcome being a completed pattern.

40. The method of claim 39 wherein said step of drawing random numbers further includes drawing a preselected number of random numbers.

41. The method of claim 39 wherein said step of resolving said wager includes resolving said wager according to a graduated paytable such that a payout amount is greater if said winning game outcome is achieved with fewer drawings of said random numbers than if achieved with a greater number of drawings of said random numbers.

42. The method of claim 19 wherein said games are keno games, and further including the steps of:

selecting lucky numbers;

indicating said lucky numbers on all of said game boards;

drawing random numbers from a field of random numbers;

indicating said drawn random numbers;

determining matching numbers, said matching numbers being said lucky numbers that coincide with said random numbers; and marking said matching numbers with a marker.

43. The method of claim 42 further including the step of duplicating said drawn random numbers into all of said game boards in said stack.

44. The method of claim 42 further including the step of duplicating a portion of said drawn random numbers into all of said game boards in said stack.

45. The method of claim 42 further including the step of duplicating said lucky numbers into all of said game boards in said stack.

46. A method for simultaneously playing multiple games on an electronic video gaming machine, comprising:

providing a play mode display on a video screen, said play mode display including a plurality of overlapping game boards arranged in a stack from a top end to a bottom end such that a face of said game board at said top end is substantially visible and a face of said game board at said bottom end is substantially hidden;

placing a wager on said game boards to be played in said stack;

providing games on each of said respective games boards to be played in said stack;

playing said games substantially simultaneously to determine respective game outcomes for said respective game boards; and resolving said wager;

wherein said step of placing a wager on said game boards in said stack includes the steps of:

providing a bet mode display on said video screen, said bet mode display including a side view of said stack divided into stack sections;

selecting a stack section; and placing a wager on said selected stack section.

47. The method of claim 46 wherein said step of placing a wager on said game boards in said stack further includes the step of selecting a number of said game boards in each of said stack sections.

48. The method of claim 47 wherein said video screen includes a touch screen, and wherein said step of selecting a number of said game boards in each of said stack sections includes the steps of:

providing a movable section tab between said stack sections;

touching said touch screen at said section tab and dragging said section tab to select said number of said game boards in each of said stack sections; and displaying said number of said game boards selected for each stack section in said section tab.

49. The method of claim 46 further including the step of displaying said wager placed on each stack section.

* * * * *

UNITED STATES PATENT AND TRADEMARK OFFICE

CERTIFICATE OF CORRECTION

PATENT NO. : 6,203,428 B1
DATED : March 20, 2001
INVENTOR(S) : Giobbi et al.

It is certified that error appears in the above-identified patent and that said Letters Patent is hereby corrected as shown below:

Column 9, claim 1,
Line 22, delete "beating" and insert -- bearing --

Column 9, claim 7,
Line 50, delete "same" and insert -- game --

Column 10, claim 17,
Line 65, delete "slay" and insert -- play --

Column 11, claim 17,
Line 7, after "respective" delete "games" and insert -- game --

Column 11, claim 18,
Line 29, after "respective" delete "games" and insert -- game --

Column 11, claim 19,
Line 52, after "respective" delete "games" and insert -- game --

Column 14, claim 46,
Line 11, after "respective" delete "games" and insert -- game --

Signed and Sealed this

Twenty-second Day of January, 2002

*Attest:*

JAMES E. ROGAN

*Attesting Officer*

*Director of the United States Patent and Trademark Office*